United States Patent [19]
Roelofs et al.

[11] Patent Number: 5,926,365
[45] Date of Patent: Jul. 20, 1999

[54] DEVICE FOR THE EXCHANGE OF INFORMATION WITH AN ELECTRONIC MEMORY CARD, AND CAR RADIO PROVIDED WITH SUCH A DEVICE

[75] Inventors: Henricus H. Roelofs, Veldhoven; Jacobus M. C. Verhoeven, Eindhoven, both of Netherlands

[73] Assignee: U.S. Philips Corporation, New York, N.Y.

[21] Appl. No.: 08/401,061

[22] Filed: Mar. 8, 1995

[30] Foreign Application Priority Data

Mar. 9, 1994 [EP] European Pat. Off. .............. 94200596

[51] Int. Cl.$^6$ ....................................................... G06F 1/16
[52] U.S. Cl. ........................... 361/684; 361/737; 439/630
[58] Field of Search ................................... 361/684, 685, 361/686, 724–26, 737, 610; 439/630, 629, 260, 267; 365/52; G06F 1/16

[56] References Cited

U.S. PATENT DOCUMENTS

| | | | |
|---|---|---|---|
| 4,602,351 | 7/1986 | Shimamura et al. | 365/52 |
| 4,986,618 | 1/1991 | Wakatsuki | 361/684 |
| 5,151,774 | 9/1992 | Mori et al. | 361/684 |
| 5,198,645 | 3/1993 | Martin et al. | 439/630 |
| 5,320,552 | 6/1994 | Reichardt et al. | 439/630 |
| 5,380,997 | 1/1995 | Hania et al. | 439/630 |

*Primary Examiner*—Leo P. Picard
*Assistant Examiner*—Lynn D. Feild
*Attorney, Agent, or Firm*—Laurie E. Gathman

[57] ABSTRACT

A device for the exchange of information with an electronic memory card which can be placed into a read position in the device through an insertion opening along an insertion track, in which position electrical contacts of the memory card are in contact with electrical contacts of the device provided on a carrier which is displaceable transversely to the insertion track. In the absence of the memory card, the contacts are situated in the insertion track under the influence of a pretensioning force. The carrier has an abutment surface which extends obliquely relative to the insertion track so that the carrier can be displaced out of the insertion track by the memory card against the pretensioning force during the passage of the memory card. In the read position of the memory card, accordingly, the carrier is in a position which is adapted to the thickness of the memory card, so that the device is suitable for cooperating with memory cards of various thicknesses. The device may be used, for example, in a car radio for cooperating with a safety card protecting against theft of the car radio. In a special embodiment, the device is fastened to a printed circuit board of the car radio, the carrier being arranged in an opening in an upper plate of the device and in an adjoining further opening in the printed circuit board, so that the compartment space required by the device in the car radio is negligibly small.

9 Claims, 6 Drawing Sheets

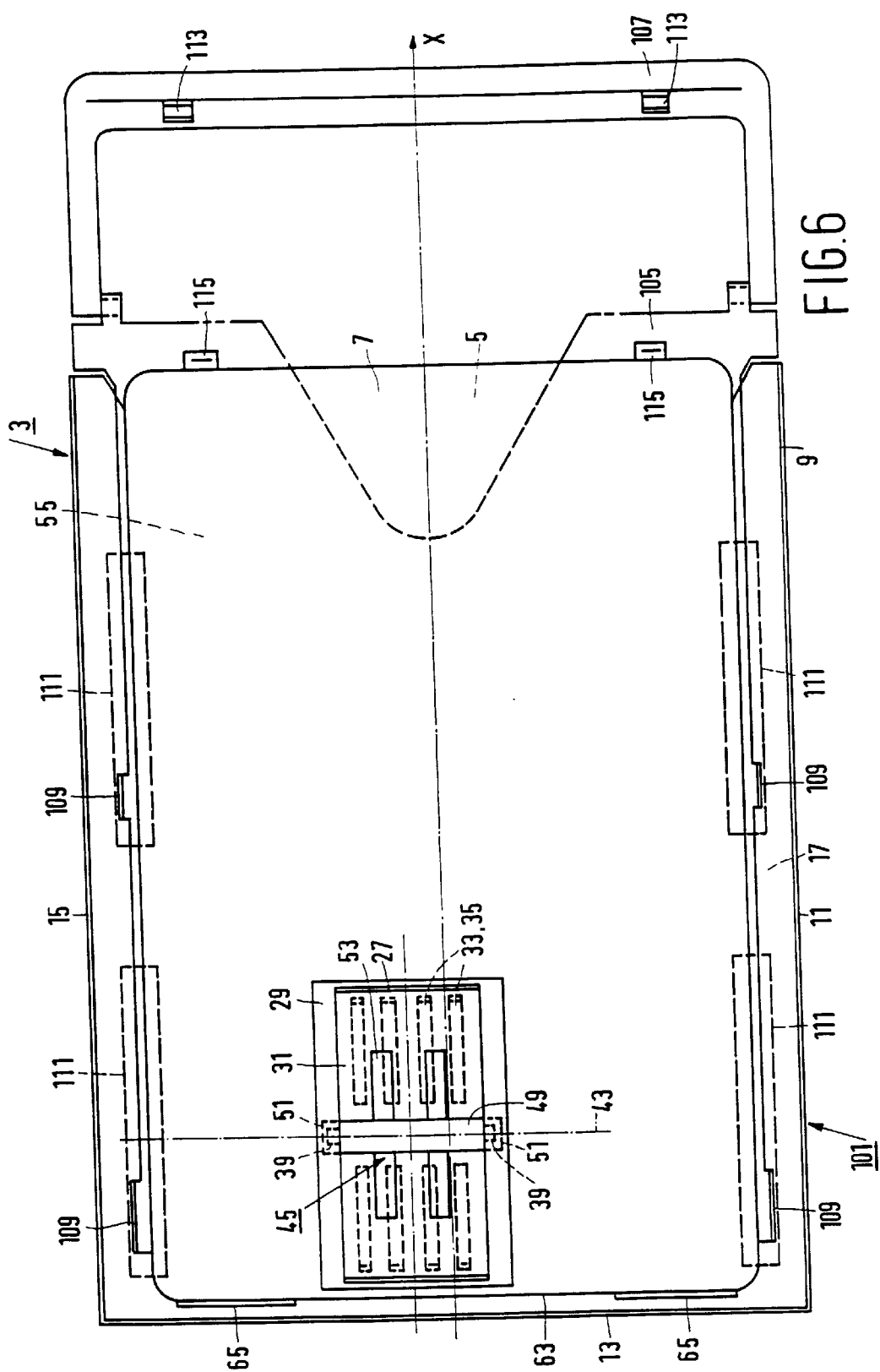

DEVICE FOR THE EXCHANGE OF INFORMATION WITH AN ELECTRONIC MEMORY CARD, AND CAR RADIO PROVIDED WITH SUCH A DEVICE

BACKGROUND OF THE INVENTION

1. Field of the Invention

The invention relates to a device for the exchange of information with an electronic memory card, which device is provided with a housing which contains a space for the insertion of the memory card along an insertion track into a read position, and a carrier which is displaceable transversely to the insertion track and comprises electrical contacts for cooperation with electrical contacts present on the memory card, the contacts of the carrier being in contact with the contacts of the memory card when the memory card is in the read position.

The invention also relates to a car radio provided with a device according to the invention.

2. Discussion of the Related Art

A device of the kind mentioned in the opening paragraph is known from European Patent Application no. 338 900 and is suitable for the exchange of information a memory card provided with a component comprising an integrated electronic circuit. In the known device, the carrier with the electrical contacts is fastened to an elastically deformable arm which extends parallel to the insertion track of the memory card. One of the two ends of the arm is fastened to the housing, while the other end of the arm is provided with a stop for the memory card. When the memory card is absent, the carrier is at some distance from the insertion track, the arm being undeformed then. During the insertion of the memory card, the front edge of the memory card comes into contact with an abutment surface of the stop which extends obliquely relative to the insertion track. The cooperation of the memory card with said abutment surface elastically deforms the arm, whereby the carrier is displaced towards the memory card and the carrier contacts come into contact with the memory card contacts.

A disadvantage of the known device is that the device is only suitable for the exchange of information with memory cards of substantially the same thickness. Owing to elastic deformation of the electrical contacts of the carrier, a comparatively narrow tolerance for the thickness of the memory card can be accommodated. The known device, however, is unsuitable for memory cards provided with a component of strongly deviating thickness. With a comparatively thin memory card, the contact forces between the contacts are insufficient or the contacts even fail to meet one another, while with a comparatively thick memory card the contact forces are too great, so that the contacts are damaged, or the memory card does not even fit between the carrier and the stop. A further disadvantage of the known device is that the front edge of the memory card is permanently mechanically loaded by the stop in the read position, so that deformation of or damage to the memory card may arise.

SUMMARY OF THE INVENTION

It is an object of the invention to provide a device of the kind mentioned in the opening paragraph which is suitable for the exchange of information with electronic memory cards of different thicknesses.

The invention is for this purpose characterized in that the carrier is in an extreme position under the influence of a pretensioning force in the absence of the memory card, the contacts of the carrier being in the insertion track then, while the carrier is displaceable out of the insertion track against the pretensioning force by the memory card during the passage of the memory card. When the memory card approaches the carrier during insertion, the carrier is displaced by the memory card over such a distance that the memory card can pass the carrier and can reach the read position. During the passage of the memory card, the contacts of the carrier meet the memory card with a certain contact force determined by said pretensioning force, while the contacts of the carrier come into contact with the contacts of the memory card when the memory card reaches the read position. The distance over which the carrier is displaced by the memory card is determined by the thickness of the memory card, so that the carrier will automatically occupy a position adapted to the thickness of the memory card in the read position of the memory card. A further advantage of the invention is that the memory card is mechanically loaded during the displacement of the carrier only. In the read position, the memory card is not loaded apart from said contact force.

A special embodiment of a device according to the invention is characterized in that the carrier has an abutment surface which extends obliquely relative to the insertion track, the carrier being displaceable by the memory card through cooperation of the memory card with said abutment surface during the passage of the memory card. The use of said abutment surface means that the device need not comprise any further means for the displacement of the carrier, so that the device has a simple and practical construction with a minimum number of components.

A further embodiment of a device according to the invention is characterized in that the pretensioning force is exerted by a mechanical spring. The use of a mechanical spring with a suitable mechanical stiffness provides a pretensioning force which is substantially independent of the position of the carrier. A contact force between the contacts is provided thereby which is substantially independent of the thickness of the memory card.

A yet further embodiment of a device according to the invention is characterized in that the carrier is guided into two parallel slots in the housing, which slots extend transversely to the insertion track, by means of two pins provided opposite one another on either side of the carrier. Guiding of the carrier in the housing by means of said pins renders the carrier pivotable about a pivot axis extending through the pins. It is achieved thereby that the carrier automatically aligns itself with the surface of the memory card through pivoting about said pivot axis if the thickness of the memory card should not be uniform owing to manufacturing tolerances.

A particular embodiment of a device according to the invention is characterized in that the carrier is positioned in an opening in a main wall of the housing, which wall extends parallel to the insertion track. The use of said opening provides a particularly small dimension of the device in a direction perpendicular to the insertion track. Thus the device is eminently suitable for use in appliances of comparatively small compartment space such as, for example, car radios or portable telephones.

A further embodiment of a device according to the invention is characterized in that the mechanical spring is a blade spring which extends substantially parallel to the insertion track and which is fastened to said main wall. This blade spring has a negligibly small dimension in a direction perpendicular to the insertion track, so that the blade spring has no adverse effects on the dimension of the device in said direction.

A car radio provided with a device according to the invention and with a printed circuit board with electrical components is characterized in that a main wall of the housing of the device extending parallel to the insertion track extends parallel to and is fastened to the printed circuit board. The arrangement of the device in this manner relative to the circuit board and its fastening thereto have the result that the device occupies a comparatively small space in the car radio, so that the dimensions of the car radio, which must lie within certain limits in view of the possibility of incorporation in an instrument panel of a car, are influenced as little as possible by the presence of the device.

A car radio provided with a device according to the invention and with a printed circuit board with electrical components, in which the carrier of the device is arranged in an opening in a main wall of the housing extending parallel to the insertion track, is characterized in that said main wall of the device extends parallel to and is fastened to the circuit board, the opening in the main wall adjoining a further opening in the circuit board, while the carrier is positioned in both openings. The use of the further opening in the circuit board for accommodating the carrier of the device further reduces the compartment space required for the device in the car radio. In addition, the electrical contacts of the carrier can be connected to the circuit board through the further opening by means of a comparatively short electric wiring.

A special embodiment of a car radio according to the invention is characterized in that the circuit board is arranged adjacent and substantially parallel to a wall of a housing of the car radio, the device being positioned between said wall and the circuit board. An interspacing which is usual and necessary between the circuit board and said wall and which is partly occupied by the components mounted on the circuit board is thus utilized for the incorporation of the device, so that the presence of the device does not affect the dimensions of the car radio housing.

BRIEF DESCRIPTION OF THE DRAWINGS

The invention will be explained in more detail below with reference to the drawings in which:

FIG. 6 is a plan view of a second embodiment of a device according to the invention.

DETAILED DESCRIPTION OF THE PREFERRED EMBODIMENTS

Figure 1:
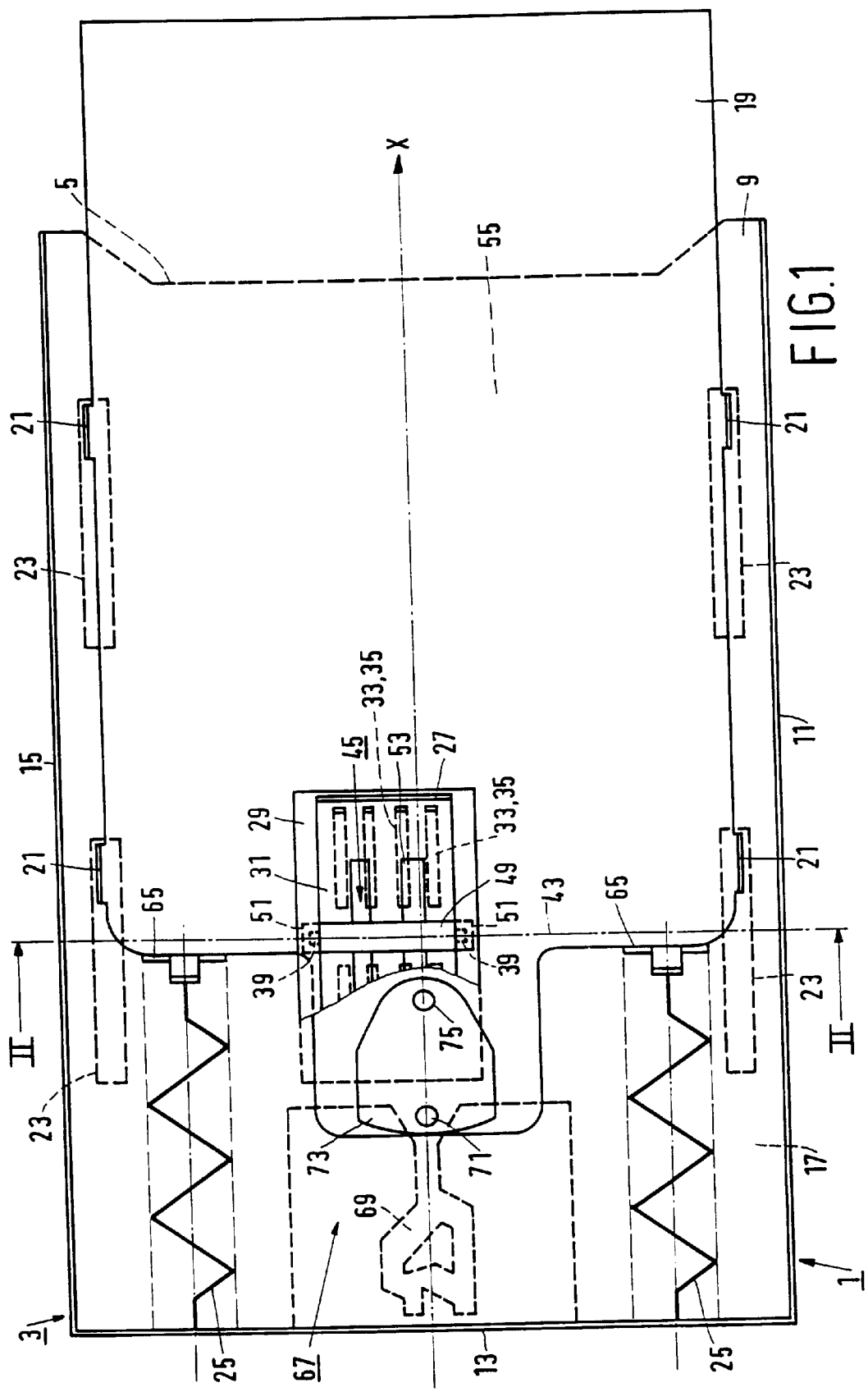
FIG. 1 is a plan view of a first embodiment of a device according to the invention.
Figure 2:
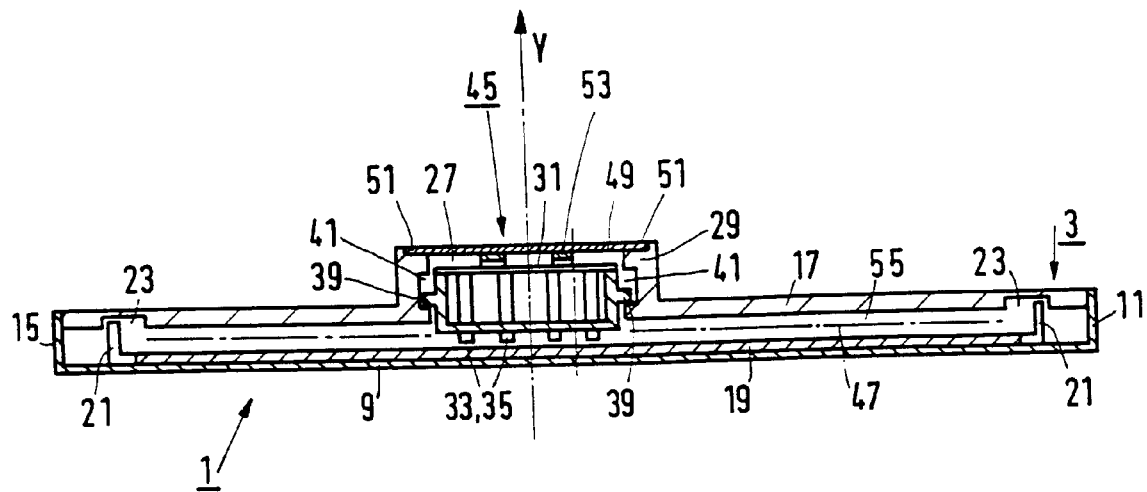
FIG. 2 is a cross-section taken on the line II—II in FIG. 1.

The first embodiment of a device 1 according to the invention shown in FIGS. 1 to 4 comprises a flat, box-shaped housing 3 which has an insertion opening 5 for an electronic memory card 7 at one side. As FIGS. 1 and 2 show, the housing 3 comprises a metal base plate 9 with bent edges 11, 13 and 15 which form the side walls of the housing 3. The housing 3 further comprises a synthetic resin upper plate 17 which is fastened between the side walls 11, 13, 15 by means of, for example, a clamp connection or a screw connection (not shown). The base plate 9 and the upper plate 17 each form a main wall of the housing 3, while the side walls 11, 13, 15 each have a surface area which is small in comparison with the surface areas of the base plate 9 and upper plate 17.

As is further shown in FIGS. 1 and 2, the device 1 comprises a plateshaped metal carriage 19 which can slide between the base plate 9 and the upper plate 17 in a longitudinal direction X of the housing 3 directed parallel to the base plate 9 and the upper plate 17. The carriage 19 is provided with four bent tags 21 and is guided by the tags 21 in four slots 23 in the upper plate 17 extending parallel to the longitudinal direction X. Two mechanical springs 25 are fastened between the carriage 19 and the side wall 13 stands opposite the insertion opening 5. When there is no electronic memory card present, the carriage 19 is in an extreme position shown in FIG. 1 under the influence of a pretension of the springs 25, in which position part of the carriage 19 extends outside the housing 3.

Figure 3:
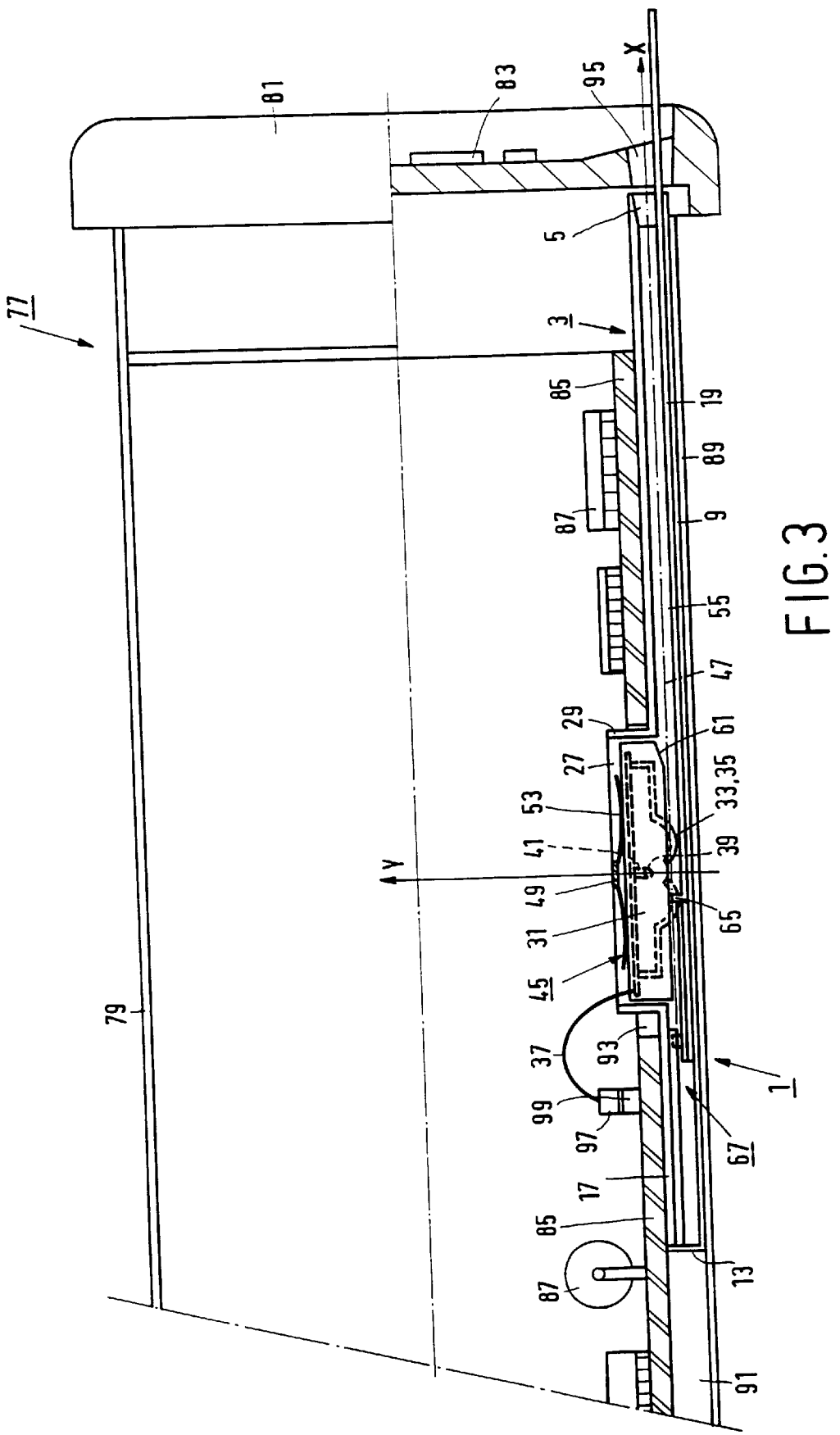
FIG. 3 is a side elevation of a car radio provided with a device according to FIG. 1, in the absence of an electronic memory card.

As is visible in FIGS. 1, 2 and 3, a rectangular opening 27 is provided in the upper plate 17 surrounded by an upright wall 29. A carrier 31 provided with eight electrical contacts 33 is arranged in the opening 27. The electrical contacts 33 each comprise an elastically deformable copper tongue 35 and are each connected to an electronic information processor (not shown in the Figures) via an electrical conductor embedded in a flexible plastic foil 37 (see FIG. 3) As FIGS. 1 and 2 show, the carrier 31 comprises two pins 39 which are arranged opposite one another on either side of the carrier 31. The carrier 31 is guided by means of the pins 39 in two parallel slots 41 provided in the upright wall 29 and extending perpendicular to the upper plate 17. The carrier 31 is thus displaceable in a Y-direction which is perpendicular to the upper plate 17, while the carrier 31 is also pivotable about a pivot axis 43 extending through the mutually opposed pins 39.

As is visible in FIGS. 2 and 3, the carrier 31 is in an extreme position in the absence of an electronic memory card under the influence of a pretensioning force of a mechanical blade spring 45, the pins 39 of the carrier 31 resting against respective ends of the slots 41. In this extreme position of the carrier 31, the electrical contacts 33 of the carrier 31 lie in an insertion track 47 indicated with a broken line in FIG. 3 through which an electronic memory card can be inserted into the device 1 in a manner yet to be described below. The mechanical blade spring 45 comprises a transverse strip 49 which is fastened with two ends in two mutually opposed recesses 51 in the upright wall 29. The blade spring 45 further comprises a number of tongues 53 which extend transversely to the transverse strip 49 and which rest on the carrier 31.

Figure 5:
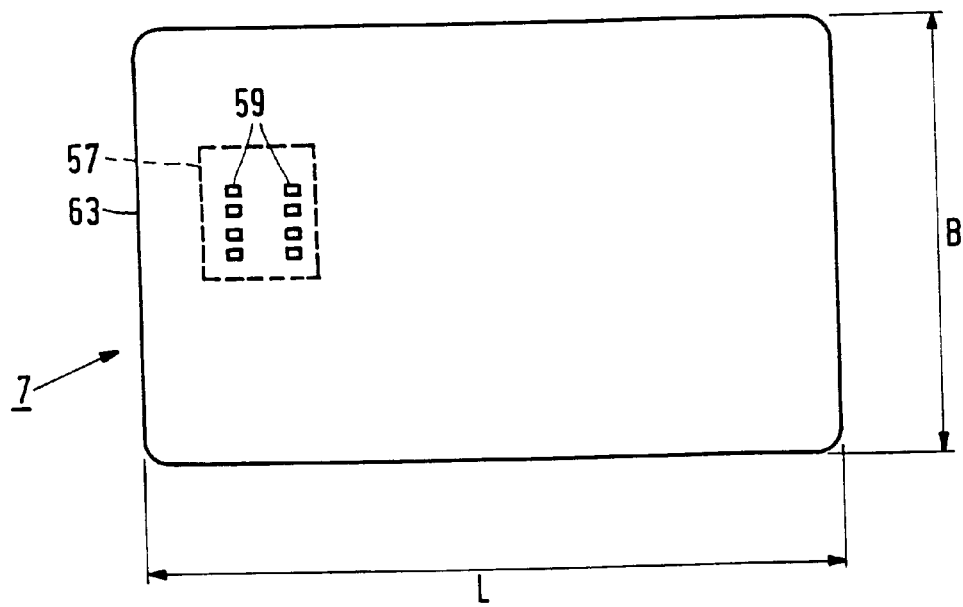
FIG. 5 shows an electronic memory card suitable for cooperating with the device of FIG. 1.
Figure 4:
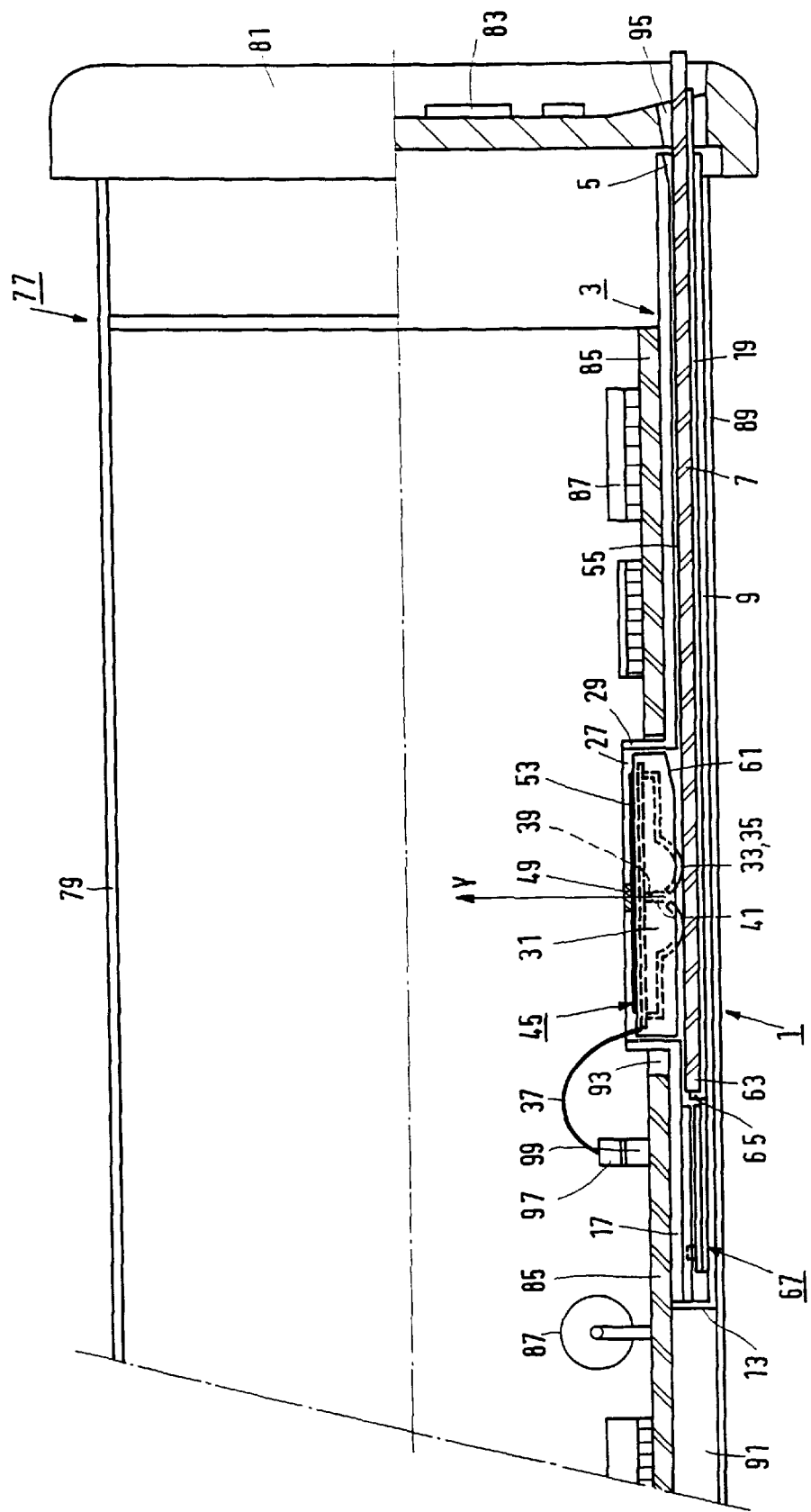
FIG. 4 shows the car radio of FIG. 3 with an electronic memory card being present.

As FIGS. 3 and 4 show, the device 1 comprises a space 55 enclosed by the base plate 9, the upper plate 17, and the side walls 11, 13, 15 for the insertion of an electronic memory card 7. As FIG. 5 shows, the memory card 7 comprises a component 57 with an integrated electronic circuit and eight electrical contacts 59 connected to electrical inputs and outputs of the component 57. Such memory cards usually have standardized dimensions and standardized positions for the electrical contacts 59 such as, for example, memory cards complying with the standard ISO 7810 having a length L of 85.6 mm, a width B of 53.98 mm and a thickness of 0.76 mm. The memory card 7 is brought into the space 55 through the insertion opening 5 by the user, during which the memory card 7 is passed over the carriage 19. The insertion track 47 mentioned above is thus formed by a surface extending substantially parallel to the carriage 19, the distance between the carriage 19 and the insertion track 47 being approximately half the thickness of the memory card 7.

As FIG. 3 shows, the carrier 31 has an abutment surface 61 which extends obliquely relative to the insertion track 47. When the memory card 7 is inserted into the space 55 in the manner described above, a front edge 63 of the memory card 7 comes into contact with the abutment surface 61, and the carrier 31 is displaced by the memory card 7 parallel to the Y-direction over such a distance that the memory card 7 can pass the carrier 31. The carrier 31 is thus displaced out of the insertion track 47 by the memory card 7 against the pretensioning force of the blade spring 45 through the cooperation of the front edge 63 of the memory card 7 with the abutment surface 61 of the carrier 31, after which the electrical contacts 33 of the carrier 31 come into contact with the memory card 7 under a certain contact force determined by the pretensioning force of the blade spring 45.

When the memory card 7 is subsequently introduced further into the space 55, the front edge 63 of the memory card 7 comes into contact with a stop 65 of the carriage 19 shown in FIGS. 1 and 4. The carriage 19 with the memory card 7 is displaced thereby parallel to the X-direction against the pretension of the springs 25 into a read position shown in FIG. 4 in which the electrical contacts 33 of the carrier 31 are in contact with the electrical contacts 59 of the memory card 7. In the read position of the memory card 7, the carriage 19 is blocked in the X-direction by a blocking mechanism 67 shown in FIG. 1 which comprises a heart-shaped slot 69 provided in the upper plate 17 and a blocking pin 71 displaceable in the heart-shaped slot 69 and provided on a pivot piece 73 which is pivotable about a stud 75 fastened to the carriage 19. The use and operation of such a blocking mechanism in a device for the exchange of information with a memory card is shown in FIG. 8 of European Patent Application 0 336 330.

With the memory card 7 in the read position, the component 57 is electrically connected to said information processor, so that data stored in the component 57 may be read or new data may be stored in the component 57. When the exchange of information with the memory card 7 has been completed, the user may remove the memory card 7 from the device 1 by pushing the portion of the memory card 7 still projecting from the insertion opening 5 in the read position further into the space 55. This releases the blocking mechanism 67, so that the carriage 19 and the memory card 7 are freed by the blocking mechanism 67 and are moved from the space 55 into the extreme position shown in FIG. 3 under the influence of the pretension of the springs 25, in which position the user can take the memory card 7 from the device 1. It is noted that the carrier 31 returns into the extreme position shown in FIG. 3 under the influence of the pretension of the blade spring 45 when the front edge 63 of the memory card 7 passes the abutment surface 61 during the removal of the memory card 7.

As was described above, the carrier 31 is displaced over such a distance by the memory card 7 during insertion of the memory card 7 that the memory card 7 can pass the carrier 31. The distance over which the carrier 31 is displaced by the memory card 7 depends on the thickness of the memory card 7. It is achieved thereby that the carrier 31 is brought into a position adapted to the thickness of the memory card 7 upon insertion of the memory card 7, so that the device 1 is suitable for cooperation with memory cards of different thicknesses, and the information processor coupled to the device 1 can be used for different purposes. The thickness of the memory card is determined inter alia by the dimensions of the electronic component(s) present in the memory card. Thus memory cards are commercially available whose length and width correspond to the length and width of the memory card according to standard ISO 7810 mentioned above, but whose thickness may be up to 1.5 mm depending on the electronic component(s) present.

The use of the construction of the carrier 31 described above gives the device 1 a particularly simple construction with a minimum number of components. The pins 39 and the blade spring 45 provide a simple and reliable guidance for the carrier 31 relative to the housing 3. Since the carrier 31 is pivotable about the pivot axis 43, the carrier 31 will automatically align itself with the surface of the memory card 7 under the influence of the pretension of the blade spring 45. A reliable contacting of the electrical contacts 33, 59 is thus provided also in the case of a memory card which does not have a uniform thickness owing to, for example, manufacturing tolerances.

The front edge 63 of the memory card 7 is mechanically loaded during the displacement of the carrier 31 by the memory card 7. The mechanical load on the front edge 63, however, may be minimized by optimizing the angle of inclination of the abutment surface 61 relative to the insertion track 47. In the read position of the memory card 7, in which the carriage 19 is locked in the X-direction by the blocking mechanism 67, the memory card 7 is mechanically not loaded except for the contact forces between the contacts 33, 59. The risk of deformation or damage of the memory card 7 owing to mechanical loads is as small as possible in this way. The contact force between the contacts 33, 59 is determined by the pretensioning force of the blade spring 45. The tongues 53 of the blade spring 45 have a comparatively great elastic deformation in the extreme position of the carrier 31 shown in FIG. 3. It is thus achieved through the use of a suitable mechanical stiffness of the tongues 53 that the pretensioning force of the blade spring 45 increases only slightly upon a displacement of the carrier 31, so that the contact force between the contacts 33, 59 depends as little as possible on the thickness of the memory card 7.

It is noted that the dimension of the device 1 in the Y-direction is determined to a major extent by the dimensions of the carrier 31. Since the carrier 31 is arranged in the opening 27 in the upper plate 17, the dimension of the device 1 is reduced to a minimum in the Y-direction. The device 1 described above thus has a dimension in the Y-direction which is only a few times the maximum possible thickness of the memory card 7. It is noted that the blade spring 45 has a negligibly small dimension in the Y-direction and thus has no adverse influence on the dimension of the device 1 in the Y-direction. As will be described below, therefore, the device 1 is eminently suitable for use and incorporation in an appliance with a comparatively small compartment space.

FIGS. 3 and 4 diagrammatically show a car radio 77 provided with the device 1 as described above. The device 1 in the car radio 77 shown has a multifunctional use. For example, a safety card may be read by the device 1, so that the car radio 77 can only be used when the data of the safety card correspond to identity data of the owner of the car radio 77 stored in the car radio 77, so that the car radio 77 is useless without a safety card, for example, after being stolen. A different type of memory card may also be used in the device 1, on which card it is possible, for example, to store traffic information automatically received through the car radio, so that the user can listen to this information later if he should have missed the information initially.

As FIGS. 3 and 4 show, the car radio 77 comprises a metal housing 79 and a front panel 81 with a number of controls 83. A printed circuit board 85 is present in the housing 79 of the car radio 77 and carries a number of electrical and/or electronic components 87 of the car radio 77 interconnected by electrical connection tracks present on the board 85. The printed circuit board 85 is positioned near a base wall 89 of the housing 79 and extends parallel to the base wall 89. A usual and necessary interspacing 91 is present between the base wall 89 and the circuit plate 85, which interspacing is partly occupied by components mounted against the lower side of the circuit board 85 and not depicted in the Figures. The device 1 is arranged in the interspacing 91, such that the upper plate 17 of the device extends parallel to and is fastened to the circuit board 85, while the base plate 9 lies against the base wall 89. The opening 27 in the upper plate 17 adjoins a further opening 93 provided in the circuit board 85, so that the carrier 31 of the device 1 is arranged in the adjoining openings 27 and 93. The insertion opening 5 of the device 1 adjoins a slot-shaped opening 95 in the front panel 81. The foil 37 with electrical conductors connected to the contacts 33 of the carrier 31 is connected by means of a plug 97 to a socket 99 which is in connection with an information processor (not shown in the Figures) of the car radio 77. Since the carrier 31 extends through the adjoining openings 27 and 93, the foil 37 may be coupled to the socket 99 without detours, so that the foil 37 has a comparatively small length. It is noted that the conductors of the foil 37 may alternatively be directly soldered to the corresponding connection tracks in the printed circuit board 85.

The device 1 occupies comparatively little space in the car radio 77 in that the device 1 is arranged relative to the printed circuit board 85 of the car radio 77 in the manner described above. With the carrier 31 positioned in the opening 93 in the board 85, the necessary compartment space between the base wall 89 and the circuit plate 85 is no more than approximately twice the maximum possible thickness of the memory card 7. Since the necessary compartment space of the device 1 is so small, the compartment space can be provided by the usual and necessary interspacing 91 between the base wall 89 and the circuit plate 85, so that the dimensions of the housing 79 of the car radio 77, which must lie within certain limits in view of the possibility of incorporation in an instrument panel of a car, are not influenced by the presence of the device 1 in the housing 79.

Figure 7:
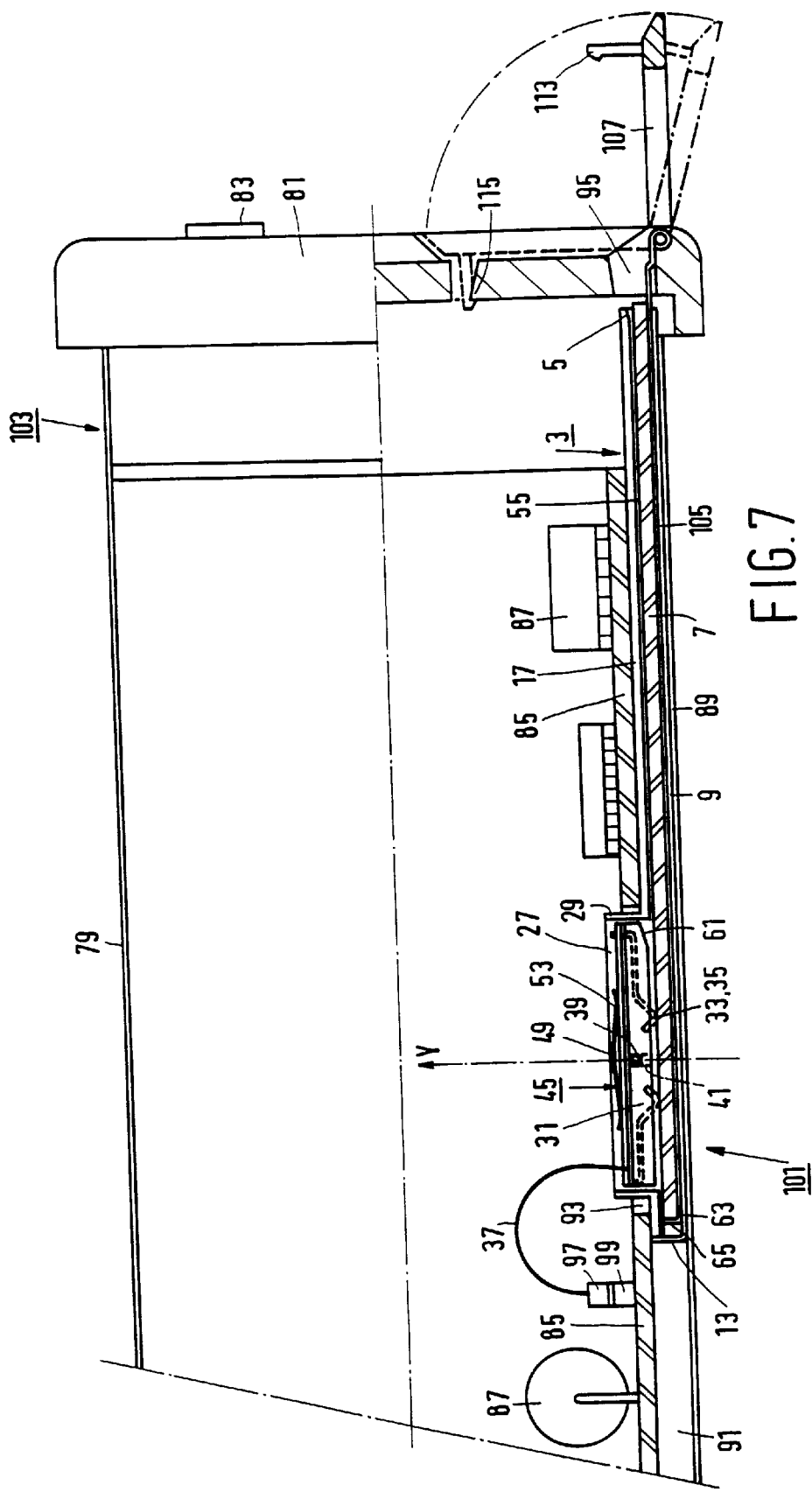
FIG. 7 is a side elevation of a car radio provided with a device according to FIG. 6.

FIGS. 6 and 7 show a second embodiment of a device 101 according to the invention. The construction of the device 101 is identical to the construction of the device 1 shown in FIGS. 1 to 4 as far as the main features are concerned. As is visible in FIG. 7, the device 101 is suitable for incorporation in a car radio 103, the manner of incorporation of the device 101 in the car radio 103 corresponding to the manner of incorporation of the device 1 in the car radio 77 shown in FIGS. 3 and 4. Corresponding parts of devices 1 and 101 and of the car radios 77 and 103 have been given the same reference numerals.

As is shown in FIGS. 6 and 7, the carriage 19, the mechanical springs 25 and the blocking mechanism 67 of the device 1 have been replaced in the device 101 by a slide 105 which can be moved by a user of the device 101 into the space 55 by means of a pivotable handle 107 which is outside the space 55. For this purpose, the slide 105 is provided, as is the carriage 19 of the device 1, with four tags 109 which are guided in four slots 111 in the upper plate 17 extend parallel to the longitudinal direction X. To insert a memory card 7 into the device 101, the user must move the slide 105 into an extreme position outside the space 55, in which the tags 109 bear on ends of the slots 111 facing towards the insertion opening 105. The memory card 7 may be moved onto the slide 105 when the latter is in this position. The memory card 7 comes into contact with the carrier 31 in a manner corresponding to that of the device 1 in that the slide 105 is subsequently moved into the space 55. As FIGS. 6 and 7 further show, the handle 107 has a snap connection 113 for cooperation with a snap rim 115 provided in the front panel 81 of the car radio 103. The slide 105 may thus be locked in a simple manner through rotation of the handle 107 when the memory card 7 is in the read position.

It is noted that, instead of the abutment surface 61, alternative means may be used in the devices 1, 101 whereby the carrier 31 can be displaced by the memory card 7 during the passage of the memory card 7. Thus the device 1, 101 may comprise, for example, a cam arranged in the insertion track 47 and coupled to the carrier 31 via an arm, or a guide wheel which is rotatably journalled in an arm coupled to the carrier 31.

The pretensioning force supplied by the blade spring 45 may be provided by alternative means such as, for example, a different kind of mechanical spring or a resilient layer of, for example, a synthetic rubber which is provided between the carrier 31 and the upper plate 17.

The carrier 31 is displaceable substantially perpendicular to the insertion track 47 in the devices 1, 101. It is achieved thereby that the mutual positions of the contacts 33, 59 in the read position of the memory card 7 do not depend on the thickness of the memory card 7. Since the surface areas of the contacts 59 of the memory card 7 provide a certain tolerance, however, a small deviation in the mutual positions of the contacts 33, 59 is admissible. Instead of a guidance for the carrier 31 which is perpendicular to the insertion track 47, therefore, a guidance of the carrier 31 is also possible which encloses a small angle (for example, less than 5 to 10°) with a perpendicular to the insertion track 47. The expression "displaceable transversely to the insertion track", accordingly, was chosen also to cover this possibility. It is further noted that instead of the two pins 39 and the slots 41, alternative means for guiding the carrier can be used such as, for example, a construction in which the carrier 31 is rotatably coupled to an arm which is journalled relative to the housing.

It is noted that the device 1, 101 requires only a small compartment space also when used in a car radio with a printed circuit board 85 which has a different position such as, for example, in a car radio with a circuit board arranged in a central plane of the housing. The dimensions of the car radio are not or substantially not influenced by the presence of the device 1, 101 also in such a car radio. Even if the carrier 31 of the device 1, 101 is not arranged in a further opening in the printed circuit board, the required compartment space is small. The device 1, 101 may in addition be positioned both below and above the printed circuit board 85, as desired.

It is finally noted that the device according to the invention is also suitable for the incorporation in a different kind of appliance such as, for example, in a portable telephone, a credit card payment unit, a presence registration unit, or a road toll payment unit. Especially when such appliances or automatic units have comparatively small, prescribed dimensions, or when such appliances and automatic units should be suitable for cooperating with different types of memory cards with inter alia different thicknesses, the features and benefits of the device according to the invention will appear to particular advantage.

We claim:

1. A device for the exchange of information with an electronic memory card, said device comprising:
   a housing which contains a space for the insertion of the memory card along an insertion track into a read position; and
   a carrier which is displaceable transversely to the insertion track, said carrier comprises electrical contacts for cooperation with electrical contacts present on the memory card, the contacts of the carrier being in contact with the contacts of the memory card when the memory card is in the read position, wherein the carrier is in an extreme position under the influence of a pretensioning force in the absence of the memory card, the contacts of the carrier being in the insertion track then, while the carrier is displaced out of the insertion track against the pretensioning force by sliding contact with the memory card during the passage of the memory card along the insertion track to the read position.

2. A device as claimed in claim 1, wherein the carrier has an abutment surface which extends obliquely relative to the insertion track, the carrier being displaceable by the memory card through cooperation of the memory card with said abutment surface during the passage of the memory card.

3. A device as claimed in claim 1, wherein the pretensioning force is exerted by a mechanical spring.

4. A device as claimed in claim 1 wherein the carrier is guided into two parallel slots in the housing, which slots extend transversely to the insertion track, by means of two pins provided opposite one another on either side of the carrier.

5. A device as claimed in claim 1, wherein the carrier is positioned in an opening in a main wall of the housing, which wall extends parallel to the insertion track.

6. A device as claimed in claim 3, wherein the mechanical spring is a blade spring which extends substantially parallel to the insertion track and which is fastened to said main wall.

7. A device as claimed in claim 1 further comprising:
   a car radio operably connected to the carrier; and
   a printed circuit board connected to the car radio with electrical components wherein a main wall of the housing of the device extending parallel to the insertion track extends parallel to and is fastened to the printed circuit board.

8. A device as claimed in claim 5 further comprising:
   a car radio operably connected to the carrier; and
   a printed circuit board connected to the car radio with electrical components wherein said main wall of the device extends parallel to and is fastened to the circuit board, the opening in the main wall adjoining a further opening in the circuit board, while the carrier is positioned in both openings.

9. A device as claimed in claim 7, wherein the printed circuit board is arranged adjacent and substantially parallel to a wall of a housing of the car radio, the device being positioned between said wall and the printed circuit board.

* * * * *